(12) United States Patent
Costanzo et al.

(10) Patent No.: US 7,812,069 B2
(45) Date of Patent: Oct. 12, 2010

(54) REVERSIBLE VISCOSITY REDUCING POLYMER

(75) Inventors: Philip J. Costanzo, San Luis Obispo, CA (US); Frederick L. Beyer, III, Rising Sun, MD (US); Robert E. Jensen, Newark, DE (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 172 days.

(21) Appl. No.: 12/254,214

(22) Filed: Oct. 20, 2008

(65) Prior Publication Data
US 2010/0099798 A1 Apr. 22, 2010

(51) Int. Cl.
*C06B 23/00* (2006.01)
(52) U.S. Cl. .................................... 523/180
(58) Field of Classification Search ................. 523/180
See application file for complete search history.

(56) References Cited

U.S. PATENT DOCUMENTS

| | | | |
|---|---|---|---|
| 3,909,497 | A | 9/1975 | Hendry et al. |
| 5,489,451 | A | 2/1996 | Omeis et al. |
| 6,652,970 | B1 | 11/2003 | Everaerts et al. |
| 2007/0149711 | A1 | 6/2007 | Chaudhary et al. |

OTHER PUBLICATIONS

Hillstrom, Warren W., "Elastomeric Binders and Bonding Agents for Desensitization of Explosives", U.S. Army Laboratory Command, Ballistic Research Laboratory Aberdeen Proving Ground, Maryland.
Szalai, ML et al., "Highly efficient; click chemistry; cross-linking; polyphenylene dendrimers; carbosilane dendrimer; polymer chemistry; anthracene; copolymers; dendrons; photomodulation", Amer Chemical Soc, 1155 16$^{th}$ St., NW, Washington, DC 20036.
Russick, EM et al., "Polymer synthesis and formulation of removable encapsulants using Diels-Alder reversible chemistry", Abstracts of Papers of the American Chemical Society 226: U414-U414, 388-Poly Part 2, Sep. 2003.
Chen, XX et al., "A thermally re-mendable cross-linked polymeric material", Science 295 (5560): 1698-1702 Mar. 1, 2002.
Ruchenstein, E. et al., "Covalent cross-linking of polymers through ionene formation and their thermal de-cross-linking", Macromolecules 33 (24): 8992-9001 Nov. 28, 2000.
Chen, XN et al., "Emulsion procedures for thermally reversible covalent crosslinking of polymers", Journal of Polymer Science Part A-Polymer Chemistry 38 (24): 4373-4384 Dec. 15, 2000.
Jones, Jr., et al., Cross-linking and modification of poly(ethylene terephthalate-co-2,6-anthracenedicarboxy by Diels-Alder reactions with malemides, Macromolecules 32 (18): 5786-5792 Sep. 7, 1999.
Sedaghat-Herati et al., "New Poly(oxyethylene) Derivatives from Diels-Alder Reactions of 3-[Methoxypoly(oxyethytene)]-medthytene Furan", Department of Chemistry, Missouri State University, Springfield, Missouri, Macromol, Chem. Phys. 205, 206, 1981-1987.
Luo, J., et al., "Highly Efficient and Thermally Stable Electro-optic Polymer from a Smartly Controlled Crosslinking Process" Adv. Mater. 2003, 15, No. 19, Oct. 2, pp. 1635-1638.
Teramoto, N., "Thermo-reversible Diels-Alder polymerization of difurfurylidene trehalose and bismaleimides", Carbohydrate Polymers 64 (2006) 78-84.
Laita, H., "The Application of the Diels-Alder Reaction to Polymers Bearing Furan Moieties. 1. Reactions with Maleimides", Eur, Polym. J. vol. 33, No. 8, pp. 1203-1211, 1997.
Durmaz, H., "Preparation of Block Copolymers Via Diels Alder Reaction of Maleimide- and Anthracene-End Functionalized Polymers", Department of Chemistry, Istanbul Technical University, Maslak 34469, Istanbul, Turkey, pp. 1667-1675.
Stranix, B., "Functional Polymers from Vinylpolystyrene, Diels-Alder Reactions with Olefins", Department of Chemistry, McGill University, 801 Sherbrooke St., W., Montreal PQ, Canada, 1997 American Chemical Society.
Kim, T., "Diels-Alder "Click Chemistry" for Highly Efficient Electrooptic Polymers", Department of Materials Science & Engineering and Department of Chemistry, University of Washington, Seattle, Washington, 98195.
Gousse, C., "Application of the Diels-Alder Reaction to Polymers Bearing Furan Moieties. 2. Diels-Alder and Retro-Diels-Alder Reactions Involving Furan Rings in Some Styrene Copolymers", Macromolecules 1998. 31. 314-321.
Gheneim, R., "Diels-Alder Reactions with Novel Polymeric Dienes and Dienophiles: Synthesis of Reversibly Cross-Linked Elastomers", Macromolecules 2002, 35, 7246-7253.
Szalai, M., "Dendrimers Based on Thermally Reversible Furan-Maleimide Diels-Alder Adducts", Macromolecules 2007, 40, 818-823.
Chang, J. et al., "A sol-gel reaction to vinyl polymers based on thermally reversible urea linkings", Polymer 42 (2001) 7589-7594.

*Primary Examiner*—Edward J Cain
(74) *Attorney, Agent, or Firm*—Christos S. Kyriakou

(57) ABSTRACT

A reversible viscosity reducing polymer is provided that has a crosslinkage between subunits inclusive of a single Diels-Alder Such a reversible viscosity reducing polymer is particularly well suited as a matrix material for a heterogeneous propellant. A process for forming a reversible viscosity reducing polymer inclusive of a single Diels-Alder linkage includes reacting a native crosslinkable moiety with a crosslinker moiety having a Diels-Alder reactive moiety of a diene or dienophile to form a Diels-Alder reactive moiety capped polymer subunit. The Diels-Alder reactive moiety capped polymer subunit is then exposed to a Diels-Alder reactant inclusive of a complementary Diels-Alder reactive moiety where the reactant also includes at least one conventional crosslinkable moiety to form a crosslinkable moiety capped polymer subunit. Reaction of the crosslinkable moiety capped polymer subunit is then reacted with a conventional multifunctional crosslinking agent.

16 Claims, 12 Drawing Sheets

US 7,812,069 B2

REVERSIBLE VISCOSITY REDUCING POLYMER

GOVERNMENT INTEREST

The invention described herein may be manufactured, used, and licensed by or for the United States Government.

FIELD OF THE INVENTION

The present invention in general relates to a polymer that reversibly builds viscosity and is capable of cycling between low viscosity and high viscosity states as a function of energy input, and in particular to such a polymer that reacts with an isocyanate curing agent forming a polymer particularly well suited to form a heterogeneous propellant matrix.

BACKGROUND OF THE INVENTION

There exist a number of instances in which it would be beneficial to have a thermoset material that is able to cure and in the process build viscosity upon cure to a cured state and thereafter is amenable to reversible reduction in viscosity and subsequent rebuilding of viscosity. Such a property would be advantageous in fields as diverse as adhesives, coatings, molding, and heterogeneous encapsulation. By way of illustration, a polyurethane adhesive after thermoset cure would have a beneficial property of being able to reversibly liquefy for the purpose of either adjusting relative orientation of adhesed articles and then rebuilding viscosity and/or to replace an object adhesed to a substrate without damage to the underlying substrate. Likewise, a marred or otherwise damaged polyurethane or polyurea coating having the attribute of reversibly reducing viscosity and thereafter rebuilding to cure viscosity would be beneficial in healing such defects in a coating. In a molding application, the formation of a "lost wax" casting positive is facilitated by the ability to reduce the viscosity of a casting model while also modifying the hydrophilicity of the components from which the model is formed to facilitate mold purge prior to a mold pour. Still further, polyurethane matrices are routinely used to encapsulate heterogeneous particulate in applications such as propellants. While the polyurethane matrix is beneficial in forming shaped propellant charges and extending storage lifetime of propellant components against reaction with oxygen and/or water, at the time of propellant ignition, the viscosity of a polyurethane matrix results in a deleterious thrust profile relative to homogeneous propellants.

Diels-Alder reactions are known to produce linkages that are thermally reversible. U.S. Pat. Nos. 5,489,451 and 6,825,315 are representative of polyacrylates and polyepoxides inclusive of Diels-Alder functionalities. Unfortunately, these chemistries have not been extended to form single Diels-Alder linkages proximal to a conventional crosslinker in a polymer and under conditions of conventional crosslinking.

Thus, there exists a need for a reversible viscosity reducing polymers such as polyurea and polyurethane polymers containing Diels-Alder linkages. There further exists a need for the use of such polymers as adhesives, coatings, moldings, and polymer matrices.

SUMMARY OF THE INVENTION

A reversible viscosity reducing polymer is provided that has a crosslinkage between subunits when the crosslinkage is inclusive of a Diels-Alder linkage in thermodynamic equilibrium with a diene and dienophile. The crosslinkage has the form:

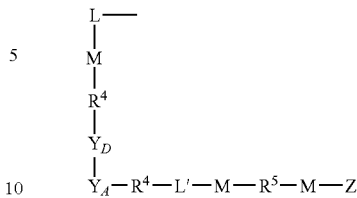

where L is covalently bonded to a first polymer subunit and is independently in each occurrence $NHR^2$—, [imidazole-$R^2$], HS—, HO—, $R^3OOC$—, $C(R^2)_2=CR^2$, $H(R^2)C=CH$—$HC=CR^3$, OCN—, XOC—(X=Cl, Br, I), $N_3$—; $R^2$ is independently in each occurrence hydrogen or $C_1$-$C_4$ alkyl; $R^3$ is an electron, hydrogen, $C_1$-$C_4$ alkyl; M is a conventional crosslinking agent moiety known to be reactive with L of isocyanate, —OH, $NH_2$, —COOH; $R^4$ is in each occurrence independently a nullity or an intermediate linker of $C_1$-$C_{30}$ alkyl, $C_2$-$C_{30}$ alkenyl, and $C_6$-$C_{24}$ aryl; $Y_D$ is a Diels-Alder reactive moiety of a diene or dienophile; $Y_A$ is a complementary Diels-Alder reactive moiety relative to $Y_D$ and is a dienophile when $Y_D$ is a diene, and vice versa; L' is independently in each occurrence $NHR^2$—, [imidazole-$R^2$], HS—, HO—, $R^3OOC$—, $C(R^2)_2=CR^2$—, $R^1=CH$—$HC=CR^3$, OCN—, XOC—(X=Cl, Br, I), $N_3$—; $R^5$ is a nullity, $C_1$-$C_{30}$ alkyl, $C_2$-$C_{30}$ alkenyl, or $C_6$-$C_{24}$ aryl; and Z is L- or L'-$R^4$—$Y_A$—$Y_D$—$R^4$-M-L- where Z is coupled to a second polymer subunit. Such a reversible viscosity reducing polymer is particularly well suited as a matrix material for a heterogeneous propellant.

A process for forming a reversible viscosity reducing polymer inclusive of a single Diels-Alder linkage within a thermoset crosslinkage occurs through reacting a native crosslinkable moiety with a crosslinker moiety having a Diels-Alder reactive moiety of a diene or dienophile attached thereto to form a Diels-Alder reactive moiety capped polymer subunit. The Diels-Alder reactive moiety capped polymer subunit is then exposed to a Diels-Alder reactant inclusive of a complementary Diels-Alder reactive moiety relative to the Diels-Alder reactive moiety where the Diels-Alder reactant also includes at least one conventional crosslinkable moiety to form a crosslinkable moiety capped polymer subunit containing an intermediate Diels-Alder linkage. Reaction of the crosslinkable moiety capped polymer subunit containing an intermediate Diels-Alder linkage is then reacted with a conventional multifunctional crosslinking agent.

DESCRIPTION OF THE PREFERRED EMBODIMENTS

Figure 1:
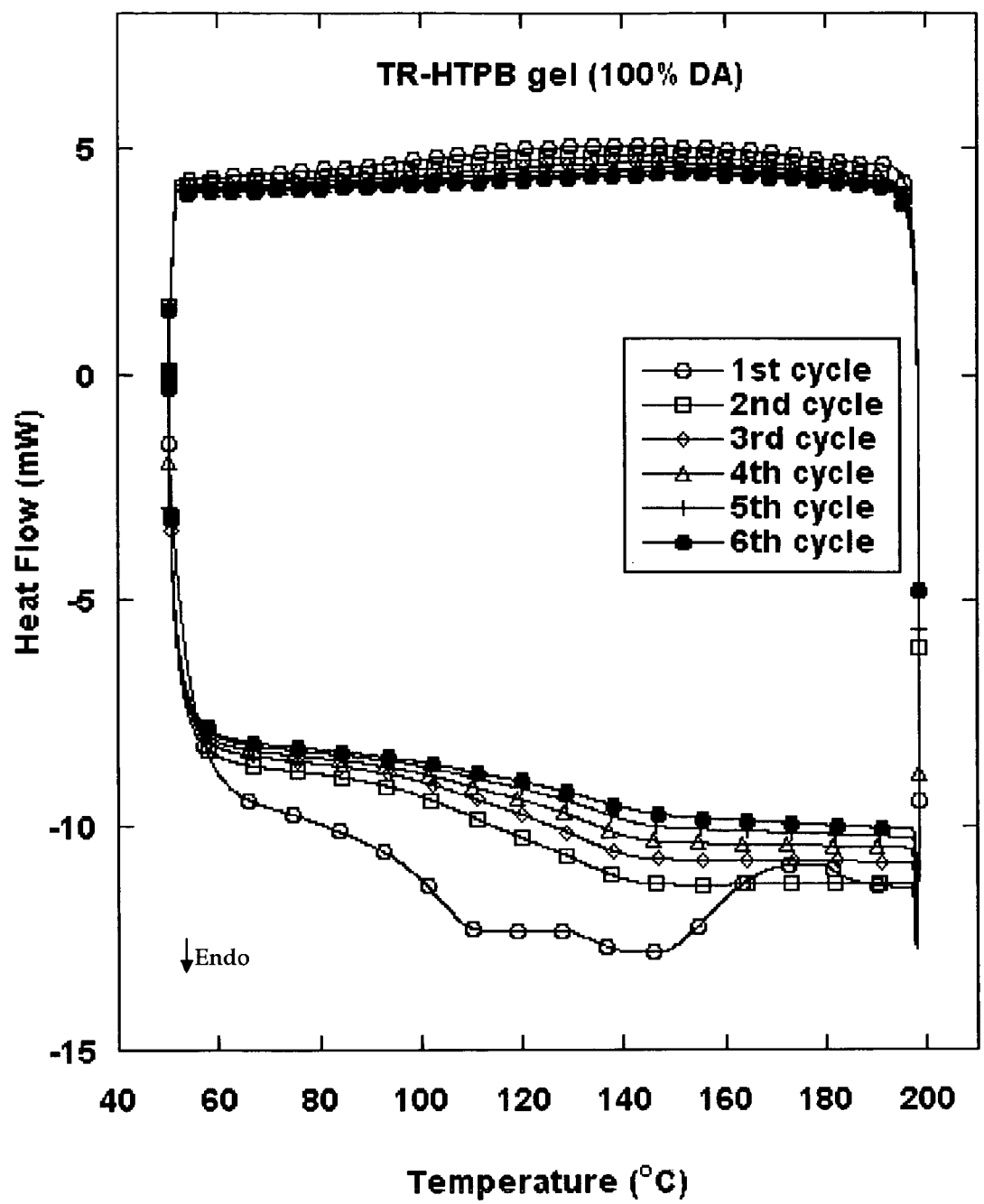
FIG. 1 is a differential scanning calorimetry plot for a polyurethane polymer according to the present invention containing 100% Diels-Alder linkages through six thermal cycles.

The present invention has utility as a reversible viscosity reducing polymer. The reversible viscosity is achieved through the inclusion of a Diels-Alder bond that is thermodynamically reversible in response to energy input such as mechanical stress or heating. Exemplary uses for an inventive polymer include, but are not limited to, adhesives, coatings, and matrices for heterogeneous propellants.

The ability to selectively reduce polymer viscosity through stimulus input allows one to readily remove or reposition such an adhesive, heal a scratched coating, and improve propellant emission performance, respectively. These desirable attributes are obtained while improving heat flow between high viscosity and low viscosity states of an inventive polymer while maintaining thermal stability and processing conditions of a conventional polymer devoid of Diels-Alder linkages.

According to the present invention, a diene or a dienophile coupled to a moiety capable of reacting with a hydroxyl or amine group of an aliphatic polymer subunit is reacted to obtain a polymer subunit having an exposed diene or dienophile. Subsequent reaction with complementary diene or dienophile necessary to form a Diels-Alder linkage and terminating in a moiety capable of conventional crosslinking incorporates reversible viscosity building characteristics into an inventive polymer.

An attribute of the present invention is the modification of a polymer subunit containing a native crosslinkable moiety first molecule to covalently bond to either a diene or dienophile to render the crosslinkable moiety no longer reactive. The exposed diene or dienophile extending from the polymer subunit is then reacted with a second molecule containing a complementary dienophile or diene, respectively, to form a Diels-Alder linkage. The second molecule carrying the complementary dienophile/diene also includes a second molecule crosslinkable moiety. The second crosslinkable moiety is induced to crosslink through exposing the polymer unit containing a Diels-Alder linkage to a conventional crosslinking agent under conditions to induce the second molecule crosslinking moiety to react. As a result, a crosslinked thermoset composition is obtained that possesses the processing and performance characteristics similar to a conventional polymer based on the polymer subunit and crosslinking agent that reversibly reduces viscosity through the thermodynamic dissociation and optional reassociation of the Diels-Alder linkages intermediate between the crosslinkages and polymer subunits.

The polymer subunit backbone optionally includes aliphatic branches, pendent nonaliphatic moieties, and backbone aliphatic unsaturations that include carbon-carbon double bonds. The aliphatic polymer subunit also has at least two native crosslinkable moieties, L and is represented by the Formula (I):

where B is a polymer subunit such as a polyalkane such as polyethylene or polypropylene, polyalkylene such as polybutadiene, or butadiene-acrylonitrile-acrylic acid, and carboxy terminated polybutadiene; L is independently in each occurrence a native crosslinkable moiety of $NHR^2$, [imidazole-$R^2$], $HS-$, $HO-$, $R^3OOC-$, $C(R^2)_2=CR^2$, $H(R^2)C=CH-$ $HC=CR^3-$, $OCN-$, $XOC-(X=Cl, Br, I)$, $R^2=C-$, $N_3-$; $R^2$ is independently in each occurrence hydrogen or $C_1$-$C_4$ alkyl; $R^3$ is an electron, hydrogen, $C_1$-$C_4$ alkyl; and m is an integer of 2 or more. Preferably, B has a molecular weight of between 500 and 10,000 g/mol. Preferably, L is the same in every occurrence. It is appreciated that m is an integer, while average m values can include non-integer values. When m is greater than 2 a crosslinked polymer may result including, but not limited to, three-dimensional crosslinked structures.

The conventional thermoset polymer precursor of Formula (I) is reacted with a first molecule having the Formula (II):

where M is a conventional crosslinking agent moiety known to be reactive with L of Formula (I) and includes isocyanate, epoxy, acid halide, azides, alkynes; $Y_D$ is a Diels-Alder reactive moiety of a diene or a dienophile; and $R^4$ is a nullity, or an intermediate linker of $C_1$-$C_{30}$ alkyl, $C_2$-$C_{30}$ alkenyl, or $C_6$-$C_{24}$ aryl. Representative dienes and dienophiles illustratively include maleimide, acid anhydrides, furans, and alkenes. It is appreciated that Y need not be a terminal moiety and is optionally a pendent moiety extending from $R^4$. Specific crosslinking moiety pairs for L-M or M-L illustratively include —OH+—NCO, —NH$_2$+NCO, —N=N—+CH$_2$CH—, —N$_3$+HC≡C—, —OH+—CHCH$_2$O, —NH$_2$+—CHCH$_2$O.

Subsequent to reaction of a polymer subunit of Formula (I) and a first molecule of Formula (II), a diene or dienophile capped polymer subunit exists. Reaction thereof with a complementary diene or dienophile creates a polymer subunit capped with a second molecule crosslinkable moiety and an intermediate Diels-Alder linkage when the second molecule has the Formula (III):

where L' and $R^4$ are each independently selected from those moieties detailed with respect to L of Formula (I) and Y of Formula (II), respectively, and need not be the identical moiety for a given L or $R^4$; $Y_A$ is a complementary Diels-Alder reactive moiety relative to $Y_D$ of the ligand of Formula (II) and selected from the Y moieties listed such that $Y_A$ is a dienophile when $Y_D$ is a diene, and vice versa; and q has a value greater than 2, including non-integer values. It should be noted that the summation of q from formula III and m from formula I must be at least four, while maintaining a minimum functionality of two for either q or m.

A generic Diels-Alder reaction is provided in Scheme 1 for a furan and maleimide.

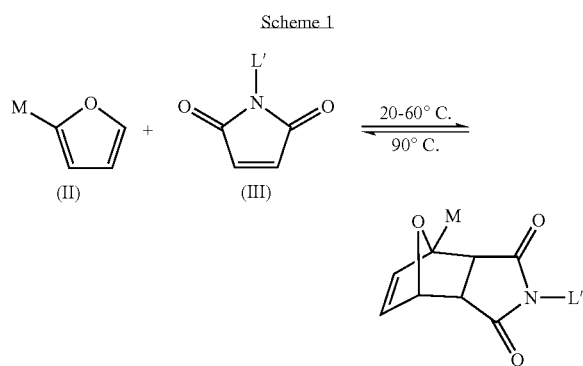

The specifics of Diels-Alder chemistry are well established in the art.

Diels-Alder chemistry involves an equilibrium between a diene and a dienophile forming a Diels-Alder linkage formed at lower temperature (right side of reaction Scheme 1) and at higher temperature equilibrium favoring dissociation of the Diels-Alder linkage. According to Scheme 1, the furan (diene) is depicted as corresponding to a first molecule of Formula (II) while the maleimide (dienophile) is depicted as being a second molecule of Formula (III).

While Scheme 1 depicts dissociation of the Diels-Alder linkage occurring at about 90° Celsius, it is appreciated that the equilibrium kinetics are readily modified through resort to other diene-dienophile pairs. By way of example, dimethyl fulvene-maleimide dissociation occurs at approximately 90° Celsius, anthracene-maleimide dissociation occurs at approximately 120° Celsius, and anthracene-anthracene Diels-Alder dissociation occurs at approximately 180° Celsius. The dissociation of the Diels-Alder linkage is endothermic thereby absorbing energy from the thermoset system. The endothermic nature of Diels-Alder linkage dissociation is particularly advantageous in applications such as heterogeneous propellant matrices. Additionally, it is appreciated that by adjusting the stoichiometry of Diels-Alder linkages present relative to the conventional polymer subunits, more than zero and up to 100% crosslinkable moieties of polymer subunit are modified to include Diels-Alder linkages prior to crosslinking. Curtailing the percent of crosslinkable moieties modified to include Diels-Alder linkages, through selection of the Diels-Alder diene and dienophiles, the heat flow, temperature, and minimal viscosity are readily tailored to a desired specification.

After reaction forming a Diels-Alder linkage ($Y_D$—$Y_A$), a polymer subunit is formed that again includes crosslinkable exposed moieties L'. Through resort to a conventional crosslinking reaction with a crosslinking agent in the form $M'_m$-$R^5$ where m is an integer of 2 or more as detailed with respect to Formula (I), M' is a conventional crosslinking agent moiety known to be reactive with L' of Formula (III) and is selected from the moieties detailed for M in Formula (II) and need not be the identical moiety for a given M, crosslinked thermoset polymer results having a reversible change in viscosity, and $R^5$ is a nullity, $C_1$-$C_{30}$ alkyl, $C_1$-$C_{30}$ alkenyl, or $C_6$-$C_{24}$ aryl. Typical of a traditional crosslinking agent operative herein is a di- or higher functionality isocyanate. Representative of such isocyanates are hexamethylene diisocyanate ("HMDI"), isophorone diisocyanate ("IPDI"), toluene diisocyanate ("TDI"), trimethylxylene diisocyanate ("TMDI"), dimeryl diisocyanate ("DDI"), diphenylmethane diisocyanate ("MDI"), naphthalene diisocyanate ("NDI"), dianisidine diisocyanate ("DADI"), phenylene diisocyanate ("PDI"), xylene diisocyanate ("MXDI"), ethylenediisocyanate ("HDI"), other diisocyanates, triisocyanates, and polyfunctional isocyanates, such as Desmodur N-100 and mixtures thereof.

In contrast to bismaleimide crosslinking agents used conventionally to crosslink epoxides, mono-maleimide or other monofunctional dieneophiles are used in the present invention to form single Diels-Alder linkages intermediate between a native polymer subunit crosslinkable moiety and a conventional multifunctional crosslinking agent to form a crosslinkage of the form:

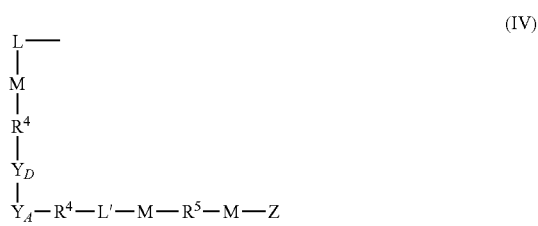

where Z is or L- or L'-$R^4$—$Y_A$—$Y_D$—$R^4$-M-L- and the variable groups have the identities detailed with respect to Formulae (I)-(III) and Z is bonded to a second polymer subunit, the bond between $Y_D$ and $Y_A$ denotes the thermodynamically reversible Diels-Alder linkage, and bonds formed between M and L or L' are exclusive condensation products formed through instances of condensation crosslinking.

An exemplary synthetic scheme through reaction with a second molecule of Formula (III) is depicted in Scheme 2 where the conventional aliphatic polymer subunit is hydroxyl terminated polybutadiene, the first molecule is 2-furfuryl isocyanate, and the second molecule is N-(4-hydroxyl-phenyl)-maleimide.

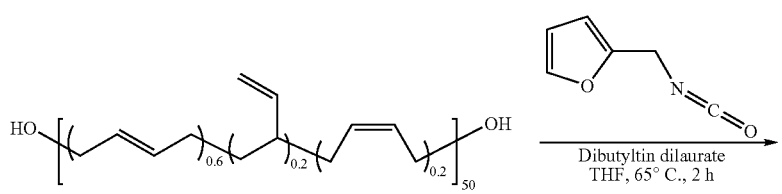

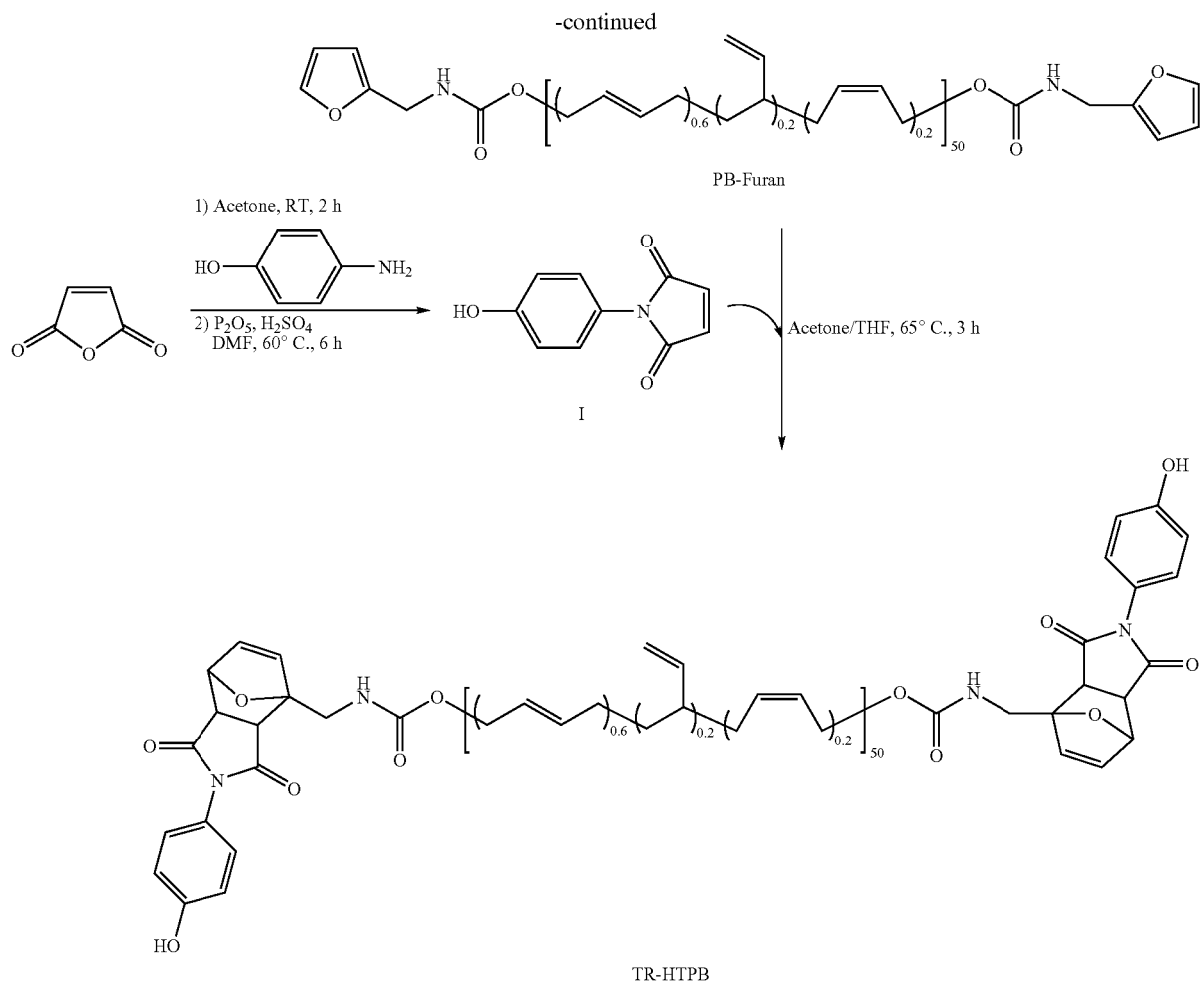

PB-Furan

TR-HTPB

The resultant polybutadiene-Diels-Alder-hydroxyl terminated thermoset polymer precursor is then crosslinked with a conventional multifunctional crosslinking agent such as a di-isocyanate such as isophorone di-isocyanate (IPDI) under conditions similar, if not identical, to those of the conventional aliphatic polymer subunit to yield a thermoset polymer with properties of a conventional crosslinked polybutadiene (PBD) with the ability to reversibly reduce and regain viscosity through dissociation and reformation of the Diels-Alder linkage, respectively.

It is appreciated that by swapping moieties M and Scheme 2 provides the conditions for equilibrium formation of PBD containing an intermediate Diels-Alder linkage and terminated in hydroxyl groups amenable to crosslinking with a conventional crosslinking agent such as a di- or tri-isocyanate.

The present invention resorts to Diels-Alder chemistry to provide a bond internal to a crosslinked thermoset composition subject to reversible scission in response to an energetic stimulus such as an increase in temperature or mechanical stress. Through selection of a Diels-Alder Y—Y' bond equilibrium as a function of temperature, the viscosity of a fully crosslinked thermoset composition is controlled based on the quantity of Diels-Alder linkages present relative to the total number of crosslinkages present.

The present invention affords new desirable properties of improved thermodynamic heat flow within a thermoset polymer while maintaining existing processing conditions and reagents relative to a conventional thermoset material lacking a Diels-Alder linkage. A particular advantage of the present invention is that system optimization associated with selecting a new base polymer or inclusion of a thermoset polymer matrix additive, both approaches require greater effort to achieve an optimal system as the heat flow characteristics of the present invention inclusive of an intermediate Diels-Alder linkage.

To form a heterogeneous propellant, an inventive prepolymer terminating in crosslinkable moieties L' and containing intermediate Diels-Alder linkages to a polymer backbone alone or in combination with a conventional polymer backbone terminated in native crosslinkable moieties L are mixed with an oxidizer, such as a $NH_4NO_3$, $NH_4ClO_3$, $NH_4ClO_4$, $NaNO_3O$, $NaClO_3$, $NaClO_3$, $KNO_3$, $KClO_3$, $KClO_4$ and other perchlorates; a particulate fuel, such as metallic particulate; and other optional additives such as a burn rate modifier, bonding agents, plasticizers, antioxidant scavengers and the like. The polymer subunits terminating in crosslinkable moieties L' and optionally L are crosslinked with conventional crosslinking agent.

With reaction between an isocyanate and a group L or L', a crosslinkage is formed. By way of example, a reaction of an isocyanate with the following L or L' moieties forms a crosslinkage as follows: hydroxyl→urethane, amine→urea, carboxyl→carbamate. Crosslinking occurs at 20° Celsius, the kinetics of a crosslinking reaction are modified by inclusion of crosslinking catalysts such as an organotin compound, heating, or change in pressure. The kinetics of isocyanate cure are well known to one of skill in the art. Component proportions and process for forming a heterogeneous propellant inclusive of Diels-Alder linkages within the thermoset polymer matrix are detailed in U.S. Pat. No. 7,011,722 where an inventive thermoset polymer is readily substituted for the conventional binder detailed therein.

The present invention is further detailed with respect to the following nonlimiting examples. These examples are not intended to limit the scope of the appended claims but rather to detail specific attributes of the invention.

Example 1

A magnetic stir bar, acetone (500 mL), and 4-aminophenol (44.5 g, 400 mmol) are loaded into a 1000 mL Erlenmeyer flask to form a brown slurry that is stirred at room temperature. Maleic anhydride (40 g, 400 mmol) is dissolved in acetone (300 mL) and added to the Erlenmeyer flask. Addition of the maleic anhydride induces a large exotherm and a color change from brown to bright yellow. The solution becomes homogenous for 3-5 min, followed by rapid precipitation of a yellow solid. The resulting mixture is stirred at room temperature for at least 2 h. The precipitate is isolated via filtration and rinsed with acetone (~200 mL). The yellow precipitate (~75 g), N,N-dimethylformamide (DMF) (50 mL) and a stir bar are loaded into a 300 mL round bottom flask. Next, a slurry of $P_2O_5$ (21 g) is prepared in DMF (70 mL) to which concentrated $H_2SO_4$ (9 g) is added. After a homogenous solution is achieved, the solution is added to the 300 mL round bottom flask and the reaction is stirred at 70° C. for at ~16 h. The solution is then cooled to room temperature and poured over a stirring solution of ice/$H_2O$, resulting in the formation of an orange precipitate. Subsequent filtration and washing with $H_2O$ yields compound 1 of scheme 2 (55 g, 73% yield) as a yellow-orange powder. $^1$H NMR: δ (ppm) 7.15 (2H, d), 6.97 (2H, s), 6.91 (2H, d).

Example 2

A magnetic stir bar, HTPB (10.5 g, 9.3 mmol OH), dibutyltin dilaurate (0.5 ml, 0.93 mmol), and $CHCl_3$ (25 mL) are loaded into a 50 mL round bottom flask. Next, 2-furfuryl isocyanate (1.0 mL, 9.3 mmol NCO) is added and the reaction is stirred at 50° C. for 2 h. The reaction is cooled to room temperature and solvent is removed via rotary evaporation to yield PB-Furan of scheme 2 in quantitative yield. $^1$H NMR: δ (ppm) 7.37 (1H, s), 6.32 (1H, s), 6.25 (1H, s), 5.8-4.8 (50.48H, br), 4.47 (2H, s), 2.4-0.9 (93.61H, br).

Example 3

A magnetic stir bar, HTPB (98.6 g, 89 mmol OH), dibutyltin dilaurate (22 mg, ~4 drops), and THF (80 mL) are loaded into a 250 mL round bottom flask. Next, 2-furfuryl isocyanate (9.4 mL, 89 mmol NCO) is added and the reaction is stirred at 65° C. for 5 h. Next, compound 1 (16.7 g, 89 mmol) is dissolved in acetone (20 mL) and added to the 250 mL round bottom flask. The reaction is stirred at 65° C. for 16 h. The reaction is cooled to room temperature and solvent is removed via rotary evaporation to yield TR-HTPB of scheme 2 in quantitative yield. $^1$H NMR: δ (ppm) 7.04 (2H, d), 6.89 (1H, d), 6.82 (2H, d), 6.79 (2H, d), 6.53 (3H, br), 5.8-4.8 (91.03H, br), 4.5 (2H, s), 2.4-0.9 (169.40H, br).

Example 4

TR-HTPB, HTPB and dibutyltin dilaurate are mixed with a Thinky ARE-250 mixer for 1 min at 2000 rpm. Ratios of TR-HTPB to HTPB to dibutyltin dilaurate are dependent upon the desired characteristics of the final material. Molar amounts of 0, 33, and 66 percent TR-HTPB with the remainder being HTPB are prepared to subsequent analysis. Next, an appropriate amount of crosslinker (isophorone diisocyanate) is added and mixed for 30 s at 2000 rpm. The resulting resin mixture is cast into molds and cured at either room temperature or 50° C. for 24 h.

Example 5

Figure 2:
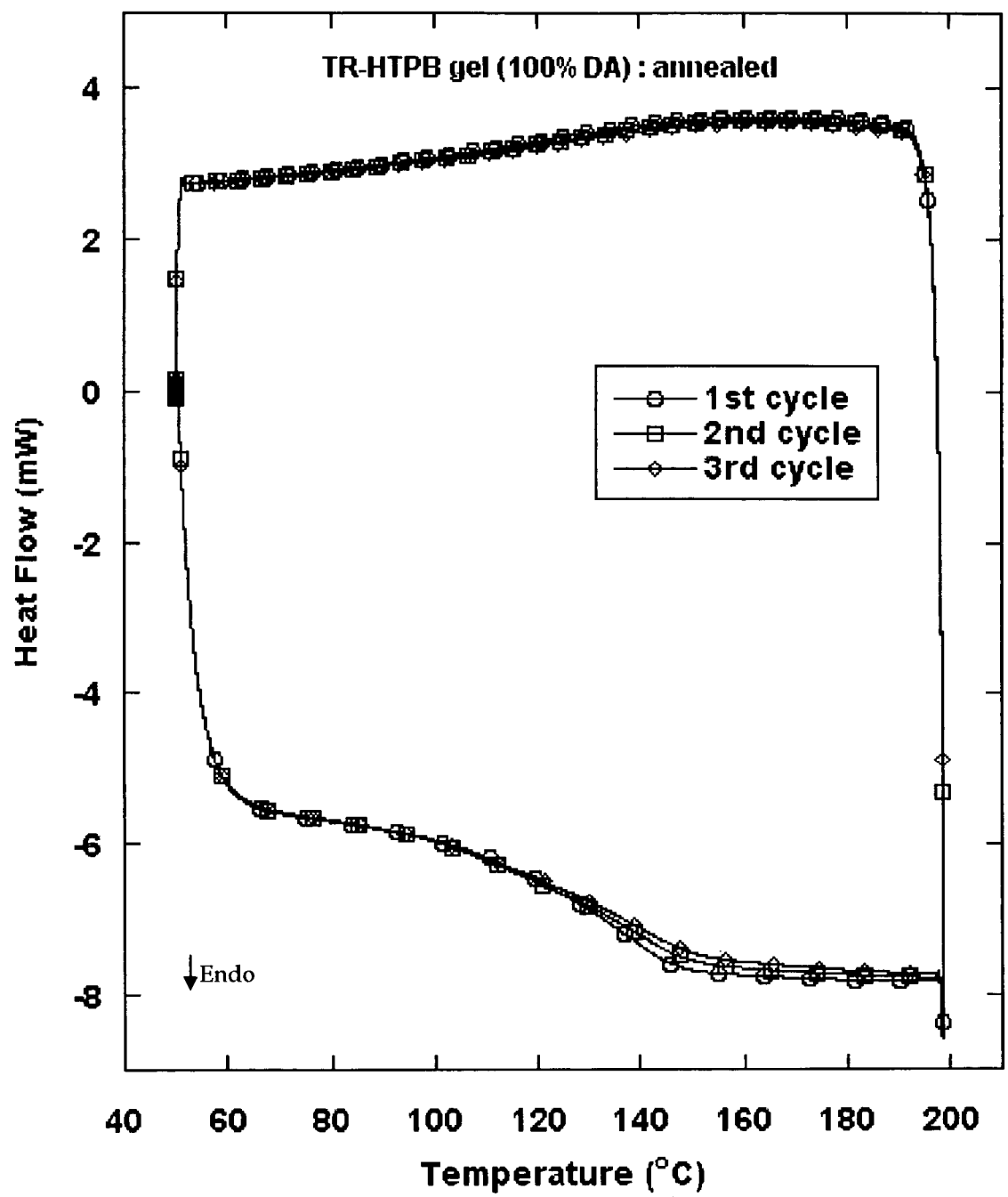
FIG. 2 is a differential scanning calorimetry plot for the polyurethane polymer shown in FIG. 1 after thermal anneal for three thermal cycles.

The polymer produced according to Example 3 is subjected to differential scanning calorimetry. 15 milligrams of the 100% Diels-Alder linkage polymer of Example 1 are held for 5 minutes at an isotherm of 50° Celsius and then subjected to a heating rate of 20° per minute to 200° Celsius and a cooling rate of −10° Celsius per minute to 50° Celsius. The sample was subjected to numerous thermal cycles. The differential scanning calorimetry graph for the sample for the first six cycles is shown in FIG. 1. A large endotherm is initially present corresponding to heat flow of 30.18 joules per gram (J/g). Annealing the same sample at 130° Celsius for 2 hours and repeating the scanning calorimetry process yields a heat flow of 1.89 J/g. In comparison to the heat flow of an inventive polymer, conventional polybutadiene having urethane linkages has a heat flow of −0.15 J/g. The differential scanning calorimetry curve for the first three cycles for the annealed sample for the first three thermal cycles is shown in FIG. 2.

Example 6

Figure 3:
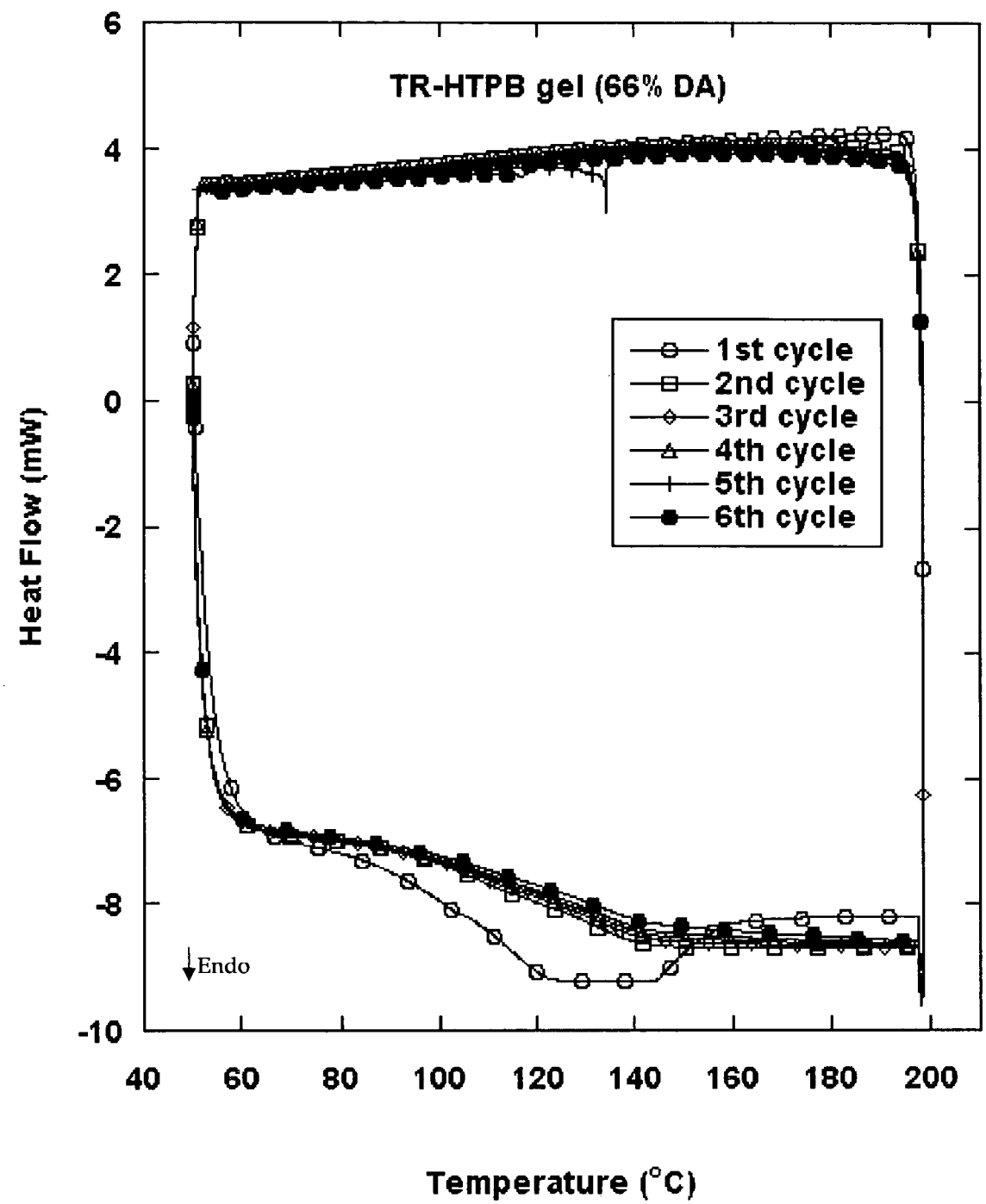
FIG. 3 is a differential scanning calorimetry plot for a polyurethane polymer according to the present invention containing 66% Diels-Alder linkages through six thermal cycles.
Figure 4:
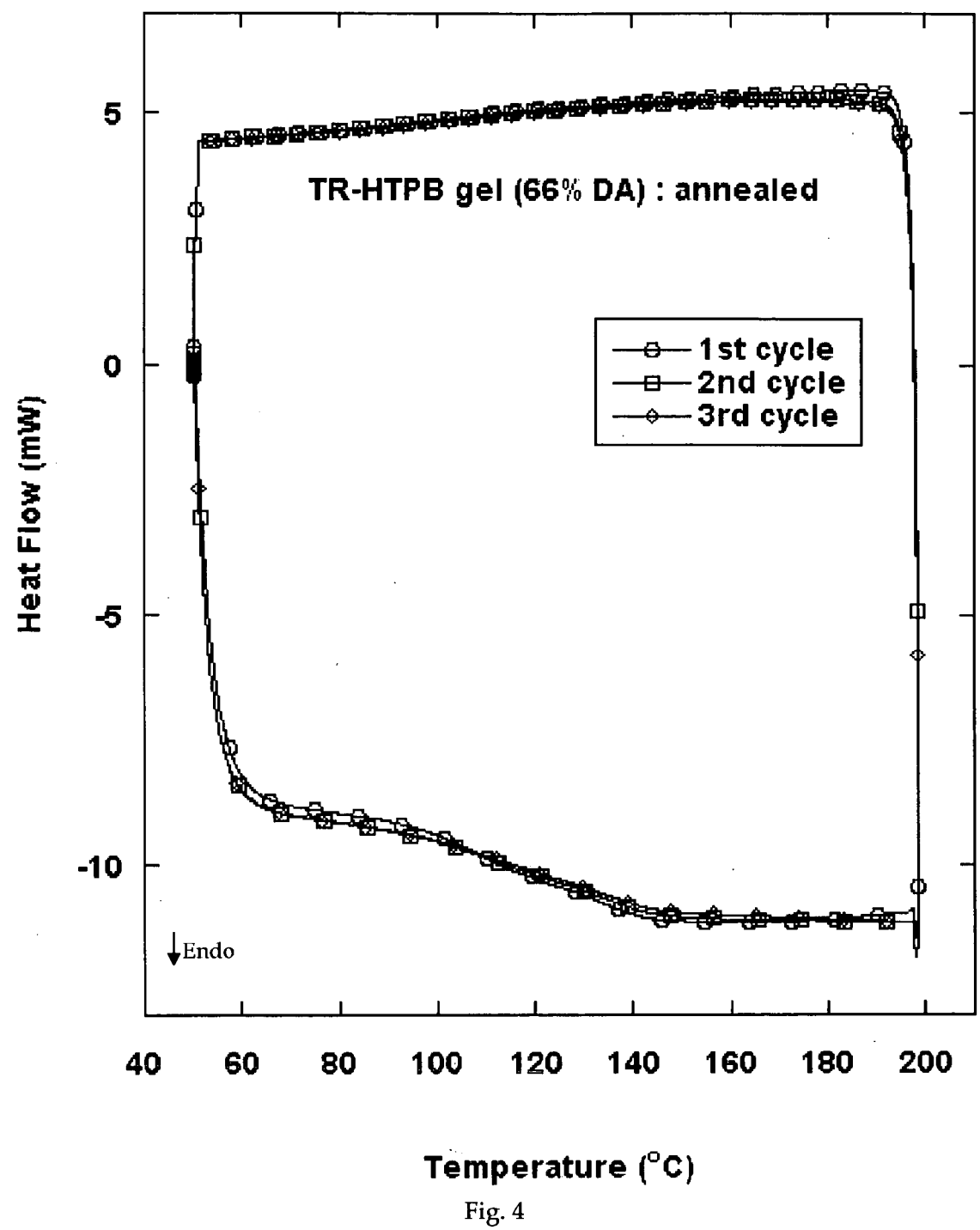
FIG. 4 is a differential scanning calorimetry plot for the polyurethane polymer shown in FIG. 3 after thermal anneal for three thermal cycles.

Differential scanning calorimetry was performed on an inventive polymer produced according to Example 4 to have 66 mole percent Diels-Alder linkages intermediate between urethane crosslinking bonds and polybutadiene polymer subunits. The first thermal cycle produced according to the same conditions as those depicted with respect to the previous figures shows a large initial endotherm of 21.42 μg in FIG. 3. After sample anneal at 130° Celsius for two hours, a change in heat flow of 0.98 μg is noted as shown in FIG. 4. In comparison, conventional urethane crosslinked polybutadiene has a change in heat flow of −0.15 J/g.

Example 7

Figure 5:
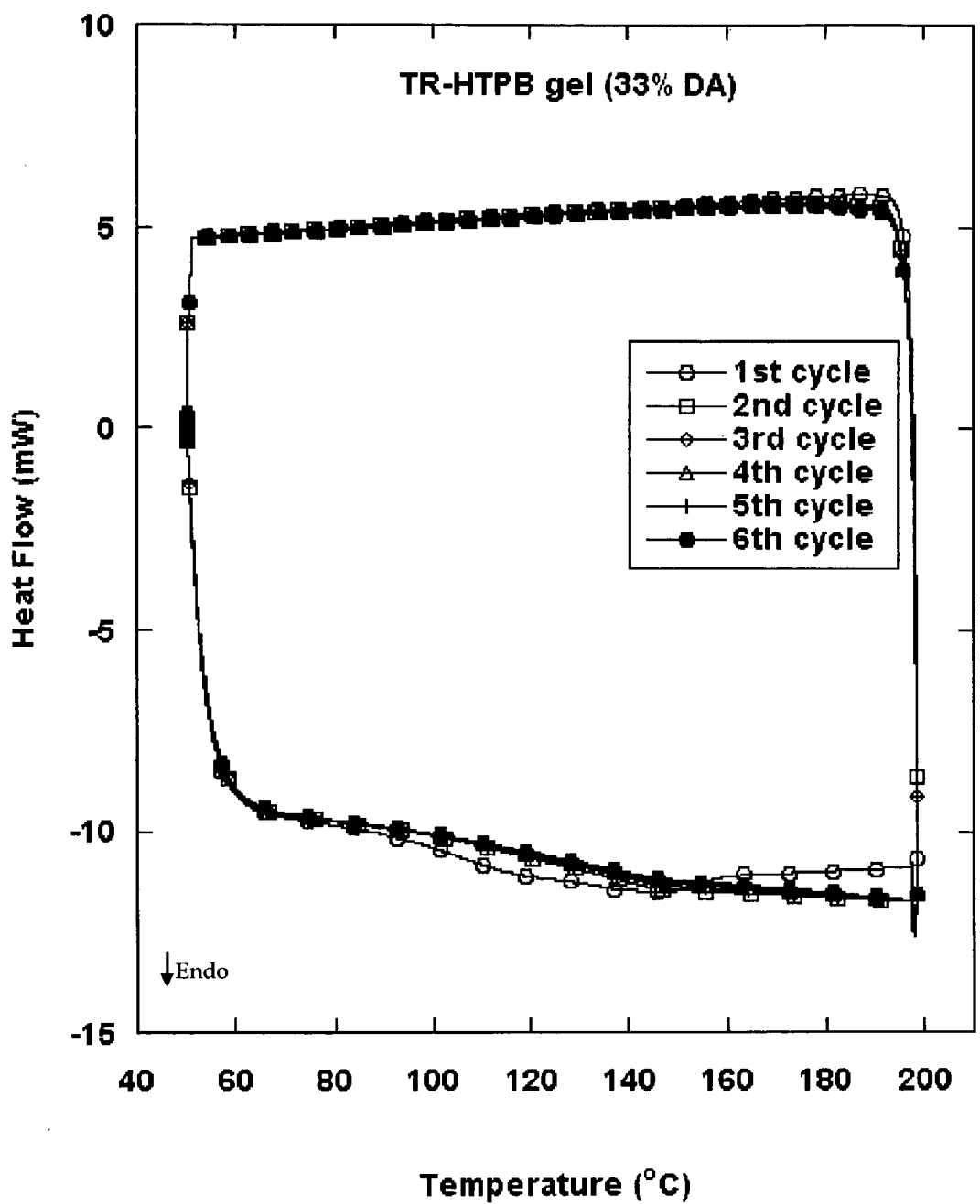
FIG. 5 is a differential scanning calorimetry plot for a polyurethane polymer according to the present invention containing 33% Diels-Alder linkages through six thermal cycles.
Figure 6:
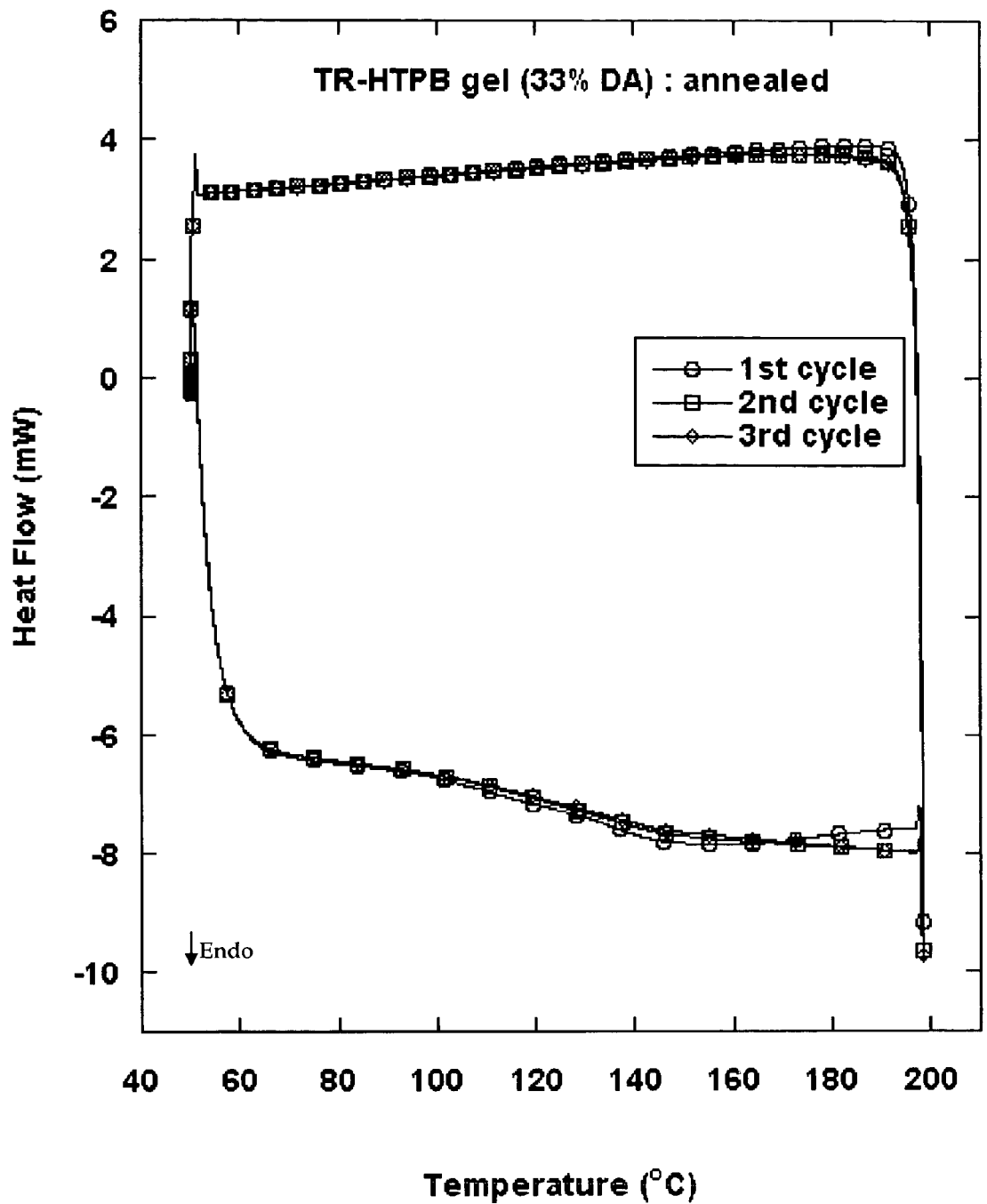
FIG. 6 is a differential scanning calorimetry plot for the polyurethane polymer shown in FIG. 5 after thermal anneal for three thermal cycles.

Differential scanning calorimetry was performed on an inventive polymer produced according to Example 4 to have 33 mole percent Diels-Alder linkages intermediate between urethane crosslinking bonds and polybutadiene polymer subunits. The first thermal cycle produced according to the same conditions as those depicted with respect to the previous figures shows a large initial endotherm of 11.83 J/g. After sample anneal at 130° Celsius for two hours, a change in heat flow of 0.77 J/g is noted as shown in FIGS. 5 and 6. In comparison, conventional urethane crosslinked polybutadiene has a change in heat flow of −0.15 μg. It is noted that sample anneal eliminates thermal history along with approximately 90% of the heat of formation energy.

Example 8

Figure 7:
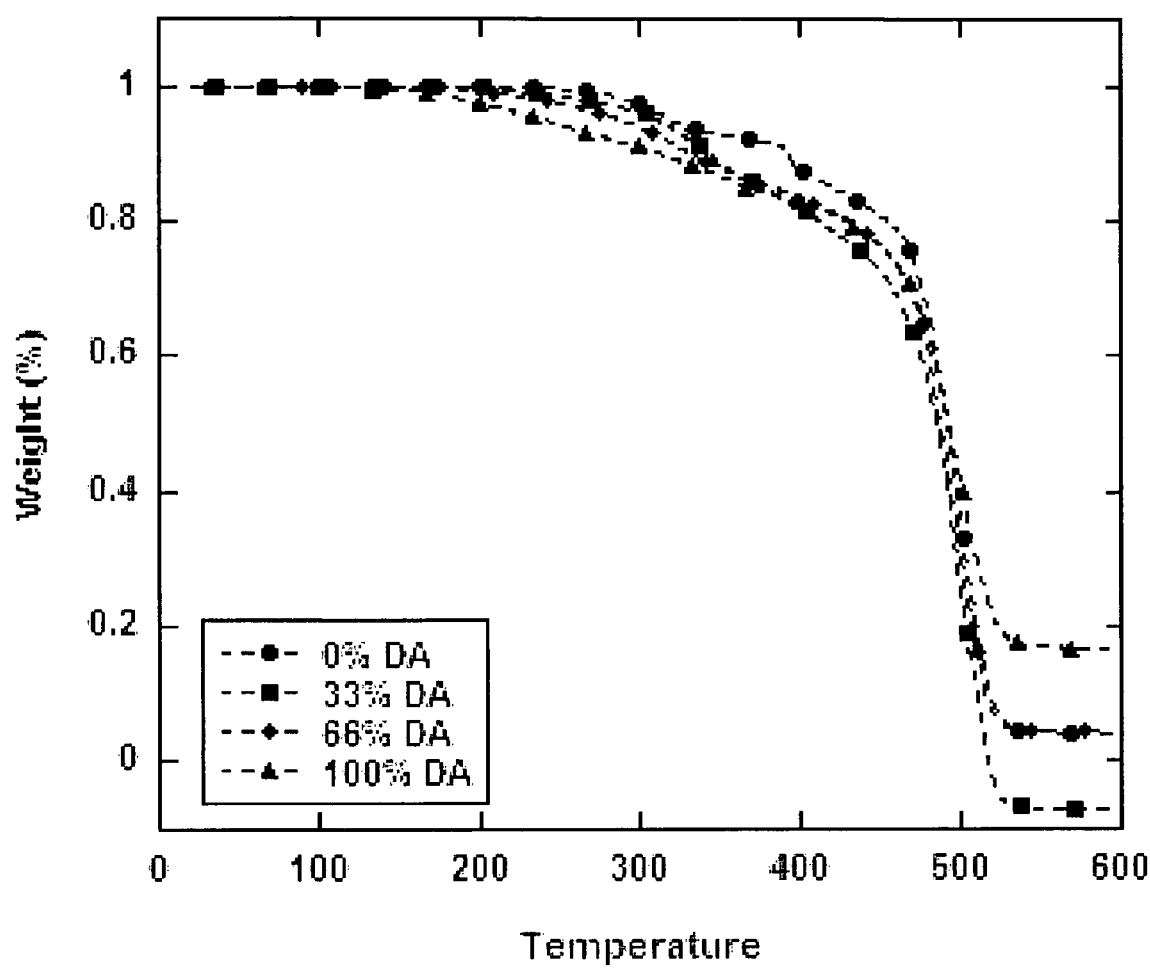
FIG. 7 is a thermogravimetric analysis for 33%, 66% and 100% Diels-Alder linkages and a comparative 0% (prior art) polyurethane polymer that is otherwise comparable to the inventive polymers.

Four gravimetric analyses of 20 milligram samples of each of the polymers produced according to Examples 3 and 4 are obtained with a heating rate of 20° Celsius per minute from 20° Celsius to 600° Celsius. A plot of thermogravimetric weight loss as a function of temperature is provided in FIG. 7. Results of thermogravimetric analysis are provided in Table 1.

TABLE 1

TGA Summary as a Function of Molar Percent Intermediate DA Linkages Present

| Sample | T @ 2% wt loss (° C.) | T @ 5% wt loss (° C.) |
|---|---|---|
| 0% DA | 292 | 318 |
| 33% DA | 265 | 313 |
| 66% DA | 235 | 288 |
| 100% DA | 189 | 240 |

Example 9

Figure 8:
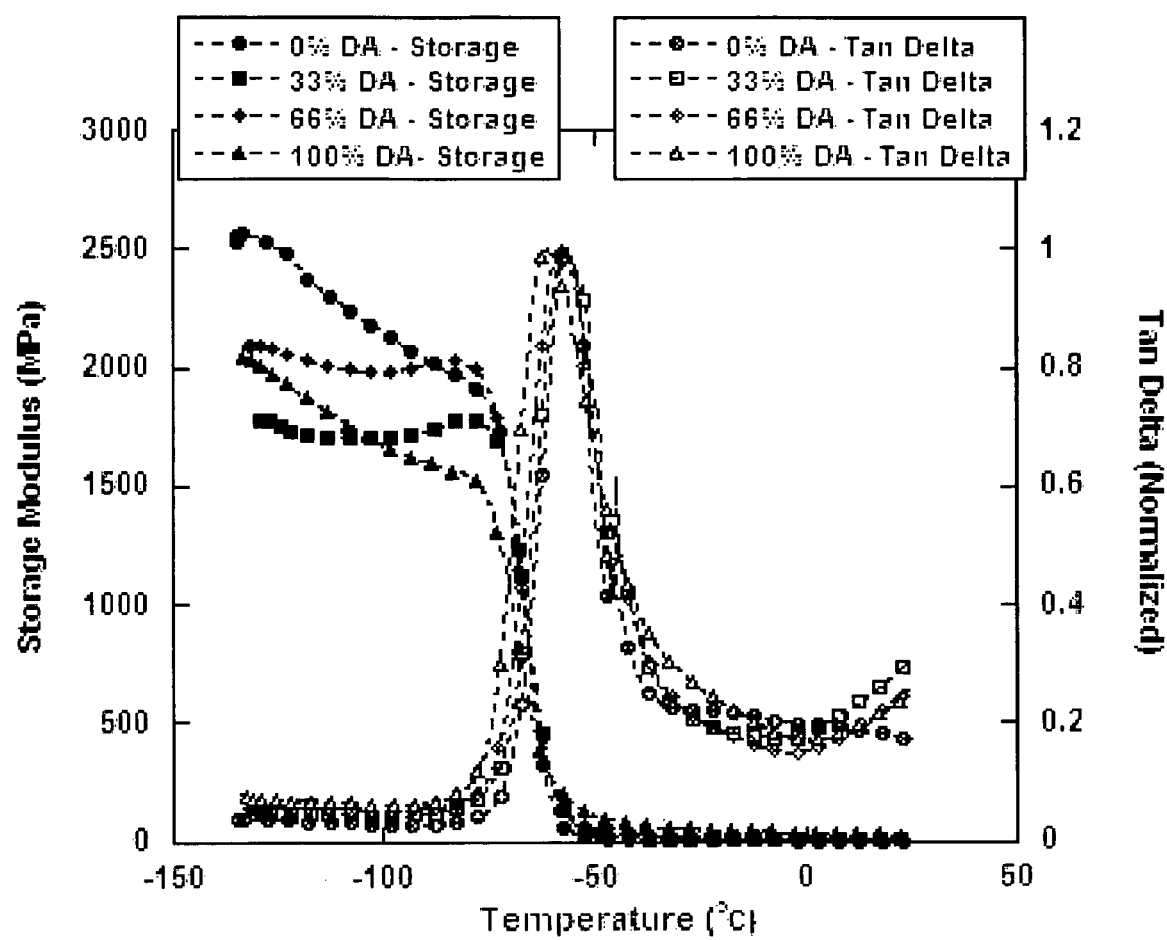
FIG. 8 is a plot of dynamic mechanical analysis for 0%, 33%, 66% and 100% Diels-Alder linkages in otherwise like polyurethane samples.

Samples produced according to Examples 3 and 4 are subjected to dynamic mechanical analysis analysis. A plot of storage modulus as a function of temperature also plotted as tan delta in normalized form is provided in FIG. 8 with samples held initially for 5 minutes at an isotherm of −135° Celsius and heated at a rate of 2° per minute to 25° Celsius at a frequency of 1 Hertz. The resultant glass transition temperatures ($T_g$ in 375 degrees Celsius) as obtained from the plot of tan delta as a function of temperature are provided in Table 2.

TABLE 2

Glass Transition Temperature for Samples as a Function of Mole Percent Diels-Alder Linkages (DA) Present

| Sample | Tg (° C.) |
|---|---|
| 0% DA | −56.56 |
| 33% DA | −58.10 |
| 66% DA | −57.93 |
| 100% DA | −61.20 |

Example 10

Figure 9:
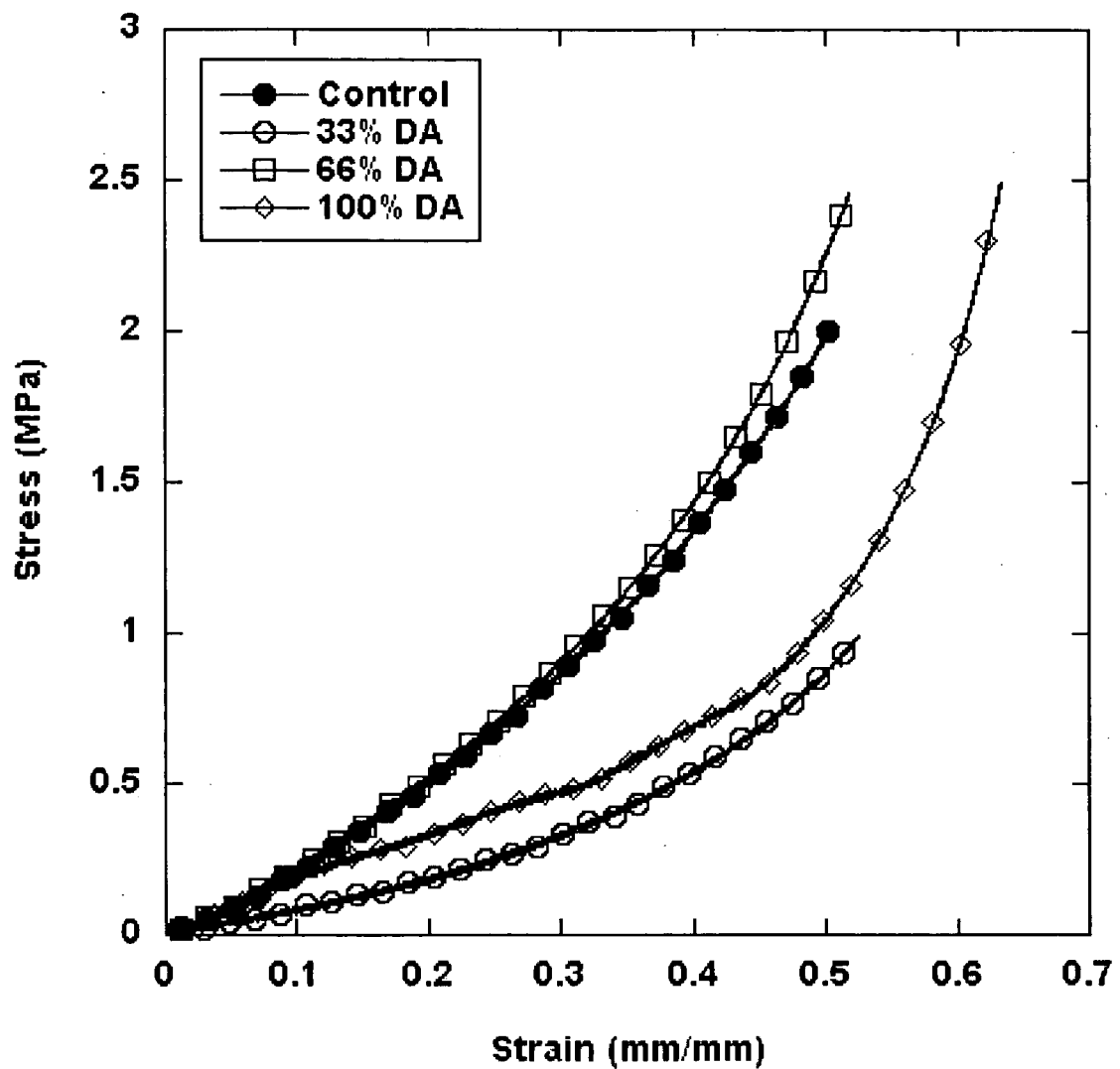
FIG. 9 is a plot of stress as a function of strain for 0%, 33%, 66% and 100% Diels-Alder linkages in otherwise like polyurethane samples.
Figure 10:
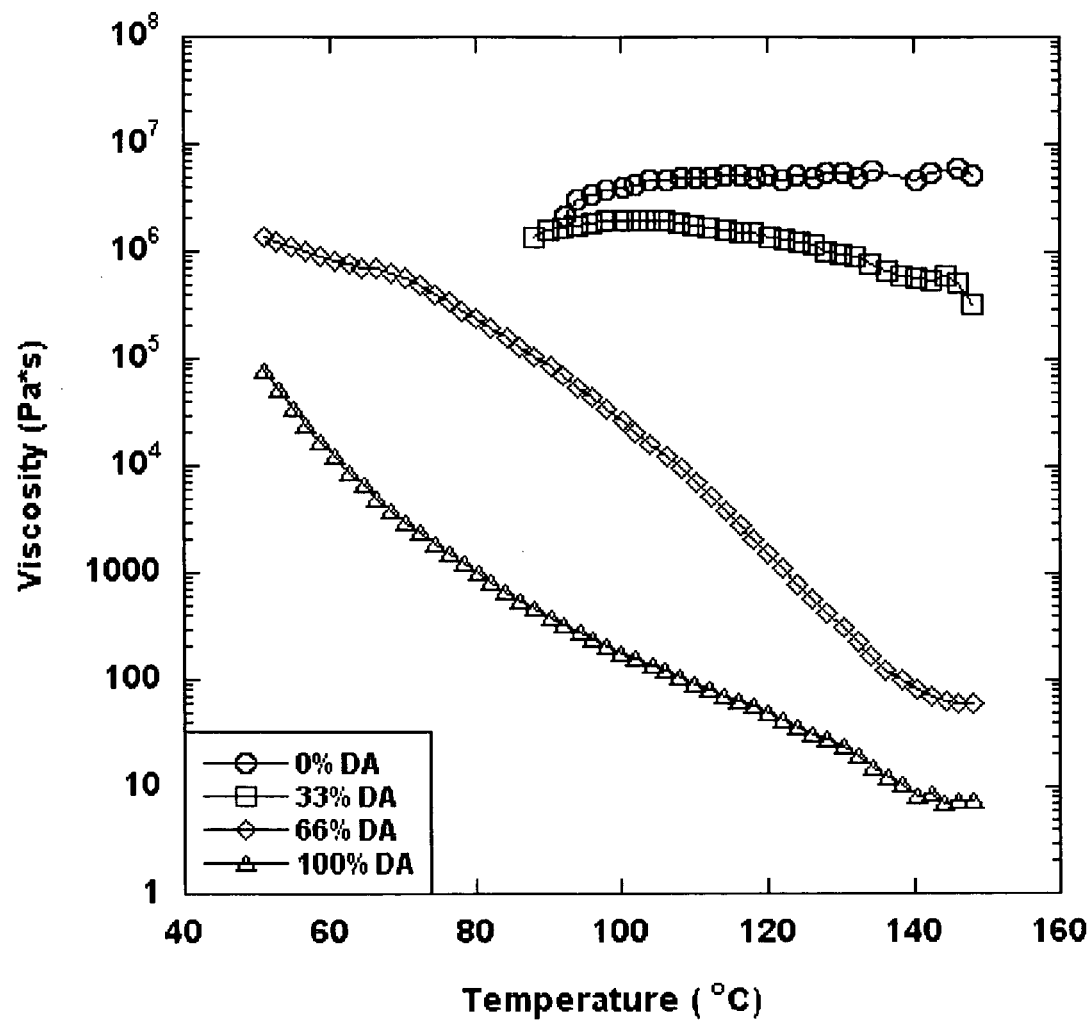
FIG. 10 is a plot of viscosity as a function of temperature for 0%, 33%, 66% and 100% Diels-Alder linkages in otherwise like polyurethane samples.
Figure 11:
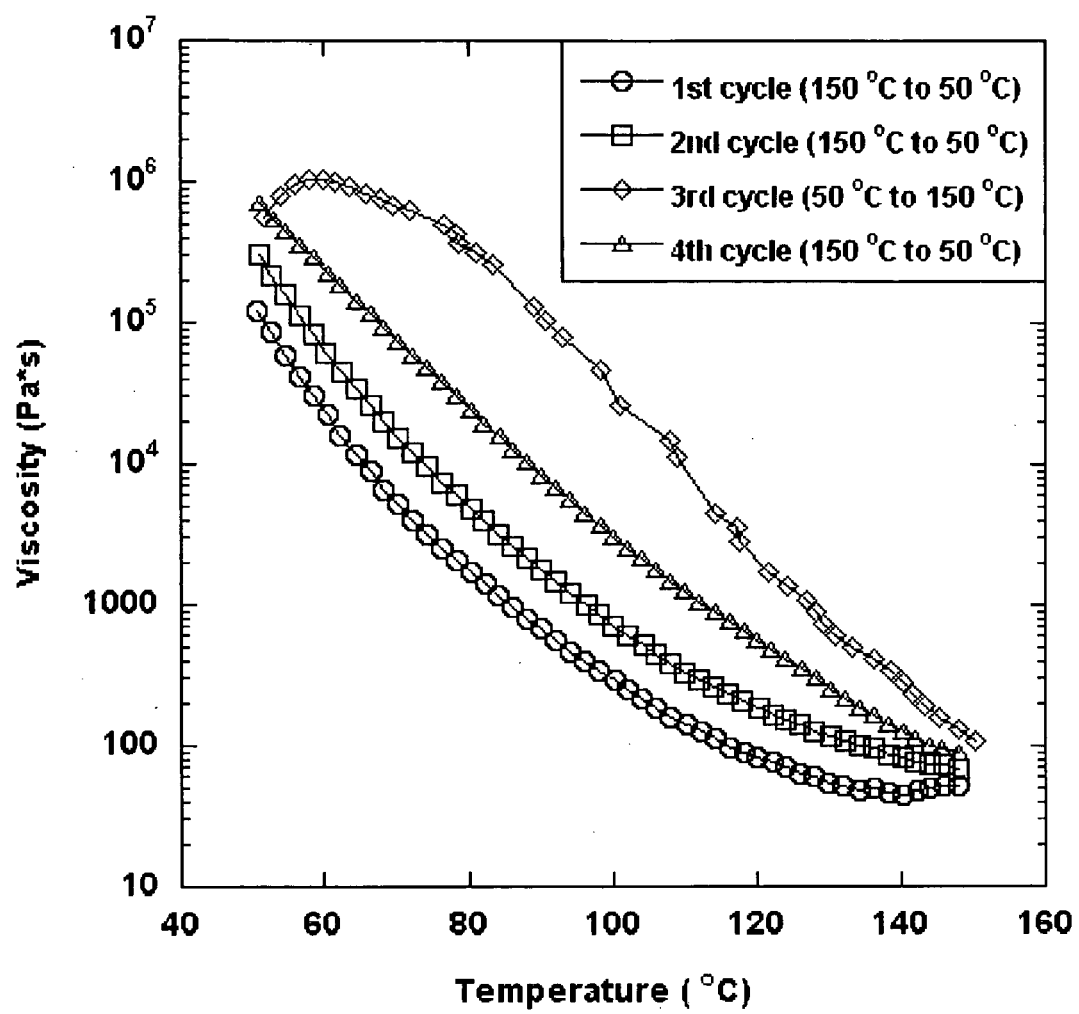
FIG. 11 is a plot of viscosity as a function of temperature for the 100% Diels-Alder linkage containing polyurethane for four thermal cycles between 50° and 150 Celsius.
Figure 12:
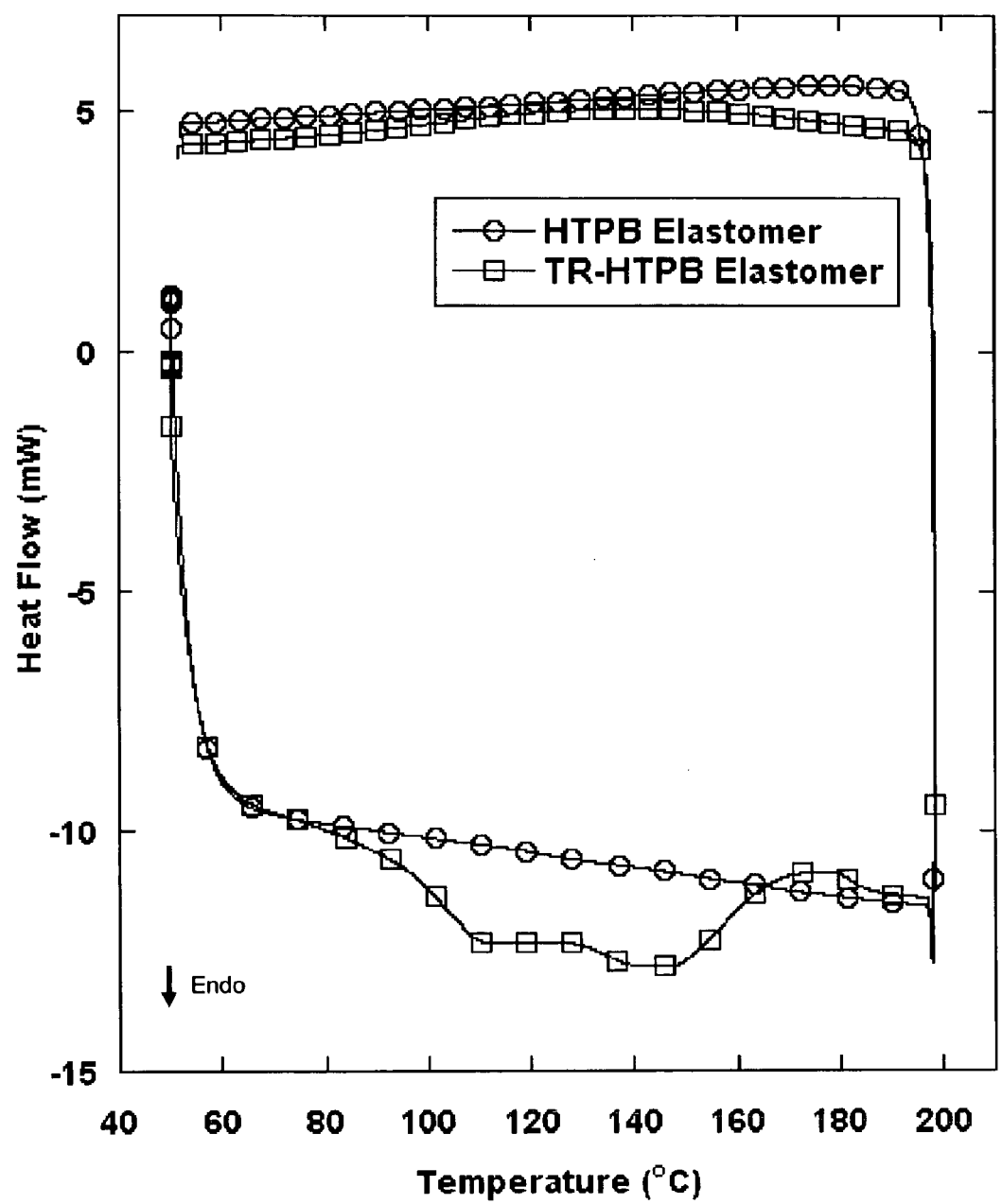
FIG. 12 is a plot of heat flow for a conventional 0% Diels-Alder linkage hydroxyl terminated polybutadiene (HTPB) and inventive 100% containing Diels-Alder modified HTPB.

Polymers produced according to Examples 1 and 2 were subjected to compression analysis at room temperature (20° Celsius) and a displacement rate of approximately 0.5 mm/min. The plots of stress as a function of strain are provided in FIG. 9. The ability to adjust material modulus through control of a percentage of Diels-Alder linkages present is noted to both increase modulus (66% and 100%) and decrease (33%) relative to conventional 0% Diels-Alder urethane crosslinked polybutadiene. It is noted from this analysis that mechanical stress is capable of cleaving a Diels-Alder linkage at 20° Celsius provides a basis for the mechanical stress imparted to an inventive polymer being the basis for thermoset viscosity breakdown.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A reversible viscosity reducing polymer comprising a crosslinkage between polymer subunits, said crosslinkage having the form:

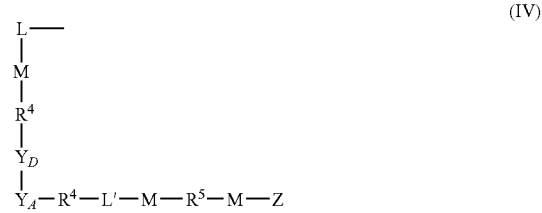

where L is covalently bonded to a first polymer subunit and is independently in each occurrence $NHR^2$—, [imidazole-$R^2$], HS—, HO—, $R^3OOC$—, $C(R^2)_2$=$CR^2$—, $H(R^2)C$=CH—HC=$CR^3$, OCN—, XOC—(X=Cl, Br, I), $R^2$≡C—, $N_3$—; $R^2$ is independently in each occurrence hydrogen or $C_1$-$C_4$ alkyl; $R^3$ is an electron, hydrogen, $C_1$-$C_4$ alkyl; M is a conventional crosslinking agent moiety known to be reactive with L of isocyanate, —OH $NH_2$, —COOH; $R^4$ is in each occurrence independently a nullity or an intermediate linker of $C_1$-$C_{30}$ alkyl, $C_2$-$C_{30}$ alkenyl, and $C_6$-$C_{24}$ aryl; $Y_D$ is a Diels-Alder reactive moiety of a diene or dienophile; $Y_A$ is a complementary Diels-Alder reactive moiety relative to $Y_D$ and is a dienophile when $Y_D$ is a diene, and vice versa; L' is independently in each occurrence $NHR^2$—, [imidazole-$R^2$], HS—, HO—, $R^3OOC$—, $C(R^2)_2$=$CR^2$—, $R^1$=CH—HC=$CR^3$, OCN—, XOC—(X=Cl, Br, I), $R^2$≡C—, $N_3$—; $R^5$ is a nullity, $C_1$-$C_{30}$ alkyl, $C_2$-$C_{30}$ alkenyl, or $C_6$-$C_{24}$ aryl; and Z is or L'-$R^4$—$Y_A$—$Y_D$—$R^4$-M-L- where Z is coupled to a second polymer subunit.

2. The polymer of claim 1 wherein L is —OH, L is —OH, and M is isocyanate.

3. The polymer of claim 2 wherein $Y_D$ is a diene.

4. The polymer of claim 3 wherein said diene is a furene or anthracene.

5. The polymer of claim 2 wherein said first polymer subunit is a polyalkylene or a polyalkyl diene.

6. The polymer of claim 5 wherein said first polymer subunit is the polyalkyl diene polybutadiene and said second polymer subunit is a polyalkylene or a polyalkyl diene.

7. The polymer of claim 1 wherein L is —$NH_2$ and M is isocyanate.

8. The polymer of claim 1 wherein said dienophile of $Y_D$ or $Y_A$ is maleimide.

9. The polymer of claim 1 wherein $R^4$ is in each occurrence a nullity.

10. The polymer of claim 1 wherein said crosslinkage is present at a percentage of total crosslinkages in the polymer along with a conventional crosslinkage -L-M-$R^5$-M-L-, and the percentage is between 10 and 99.

11. A heterogeneous propellant comprising:
perchlorate oxidizer particulate;
a reversible viscosity building polymer comprising a crosslinkage between polymer subunits, said crosslinkage having the form:

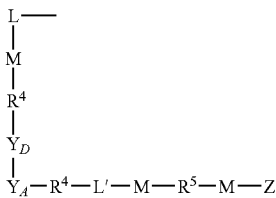
(IV)

where L is independently in each occurrence $NHR^2$, [imidazole-$R^2$], HS—, HO—, $R^3OOC$—, $C(R^2)_2$=$CR^2$, $H(R^2)C$=CH—HC=$CR^3$—, OCN—, XOC—(X=Cl, Br, I), $R^2$≡C—, $N_3$—; $R^2$ is independently in each occurrence hydrogen or $C_1$-$C_4$ alkyl; $R^3$ is an electron, hydrogen, $C_1$-$C_4$ alkyl; M is a conventional crosslinking agent moiety known to be reactive with L; $R^4$ is in each occurrence independently a nullity or an intermediate linker of $C_1$-$C_{30}$ alkyl, $C_2$-$C_{30}$ alkanyl, and $C_6$-$C_{24}$ aryl and; $Y_D$ is a Diels-Alder reactive moiety of a diene or dienophile; $Y_A$ is a complementary Diels-Alder reactive moiety relative to $Y_D$ and is a dienophile when $Y_D$ is a diene, and vice versa; L' is independently in each occurrence $NHR^2$—, [imidazole-$R^2$], HS—, HO—, $R^3OOC$—, $C(R^2)_2$=$CR^2$—, $H(R^2)C$=CH—HC=$CR^3$—, OCN—, XOC—(X=—Cl, Br, I), $N_3$—; $R^5$ is a nullity, $C_1$-$C_{30}$ alkyl, $C_2$-$C_{30}$ alkenyl, or $C_6$-$C_{24}$ aryl; and Z is L- or L'$R^4$—$Y_A$—$Y_D$—$R^4$-M-L- where Z is coupled to a second polymer subunit; and wherein the polymer surrounds said perchlorate oxidizer particulate and said metal particulate.

12. The propellant of claim 11 wherein L is —OH, L' is —OH, and M is isocyanate.

13. The propellant of claim 11 wherein one of said polymer subunits is polybutadiene and a second of said polymer subunits is polybutadiene.

14. The propellant of claim 13 wherein L is —OH, L' is —OH and M is isocyanate.

15. A process for forming a reversible viscosity reducing polymer through inclusion of a Diels-Alder linkage within a thermoset crosslinkage, said process comprising:

reacting a polymer subunit having at least two native crosslinkable moieties L where L is independently in each occurrence a native crosslinkable moiety of $NHR^2$, [imidazole-$R^2$], HS—, HO—, $R^3OOC$—, $C(R^2)_2$=$CR^2$—, $R^1$=CH—HC=$CR^3$, OCN—, XOC—(X=Cl, Br, I), $R^2$≡C—, $N_3$— where $R^2$ is independently in each occurrence hydrogen or $C_1$-$C_4$ alkyl; $R^3$ is an electron, hydrogen, $C_1$-$C_4$ alkyl; $R^3$ is an electron, hydrogen, $C_1$-$C_4$ alkyl; M is a conventional crosslinking agent moiety known to be reactive with L of isocyanate, —OH, $NH_2$, —COOH; $R^4$ is in each occurrence independently a nullity or an intermediate linker of $C_1$-$C_{30}$ alkyl, $C_2$-$C_{30}$ alkenyl, and $C_6$-$C_{24}$ aryl, with $$M\text{-}R^4\text{—}Y_D \quad (II)$$

where M is a conventional crosslinking agent moiety known to be reactive with L; $Y_D$ is a Diels-Alder reactive moiety of a diene or a dienophile; and $R^4$ is a nullity, or an intermediate linker of $C_1$-$C_{30}$ alkyl, $C_2$-$C_{30}$ alkenyl, $C_6$-$C_{24}$ aryl in a first reaction environment to form a $Y_D$-capped polymer subunit;

exposing said $Y_D$-capped polymer subunit to a Diels-Alder reactant having the formula:

$$(L')_q\text{-}R^4\text{—}Y_A \quad (III)$$

where L and $R^4$ are in each occurrence independently the groups previously detailed for L and $R^4$ of formula (II), respectively; $Y_A$ is a complementary Diels-Alder reactive moiety relative to $Y_D$ of Formula (II) and selected from the $Y_D$ moieties listed such that $Y_D$ is a dienophile when $Y_A$ is a diene, and vice versa; and q is an integer value of 1 to 3 inclusive to form an L'-capped polymer subunit containing an intermediate Diels-Alder linkage in a second reaction environment;

crosslinking said L'-capped polymer subunit having an intermediate Diels-Alder linkage with a conventional multifunctional crosslinking agent of the formula: M-$R^5$-M where M is a conventional crosslinking agent moiety known to be reactive with L' and $R^5$ is a nullity, $C_1$-$C_{30}$ alkyl, $C_2$-$C_{30}$ alkenyl, or $C_6$-$C_{24}$ aryl.

16. The process of claim 15 wherein the first reaction environment has a first environment temperature of between 20° and 60° Celsius and the second reaction environment has a second reaction environment temperature of between 20° and 60° Celsius.

\* \* \* \* \*